Figure 1:
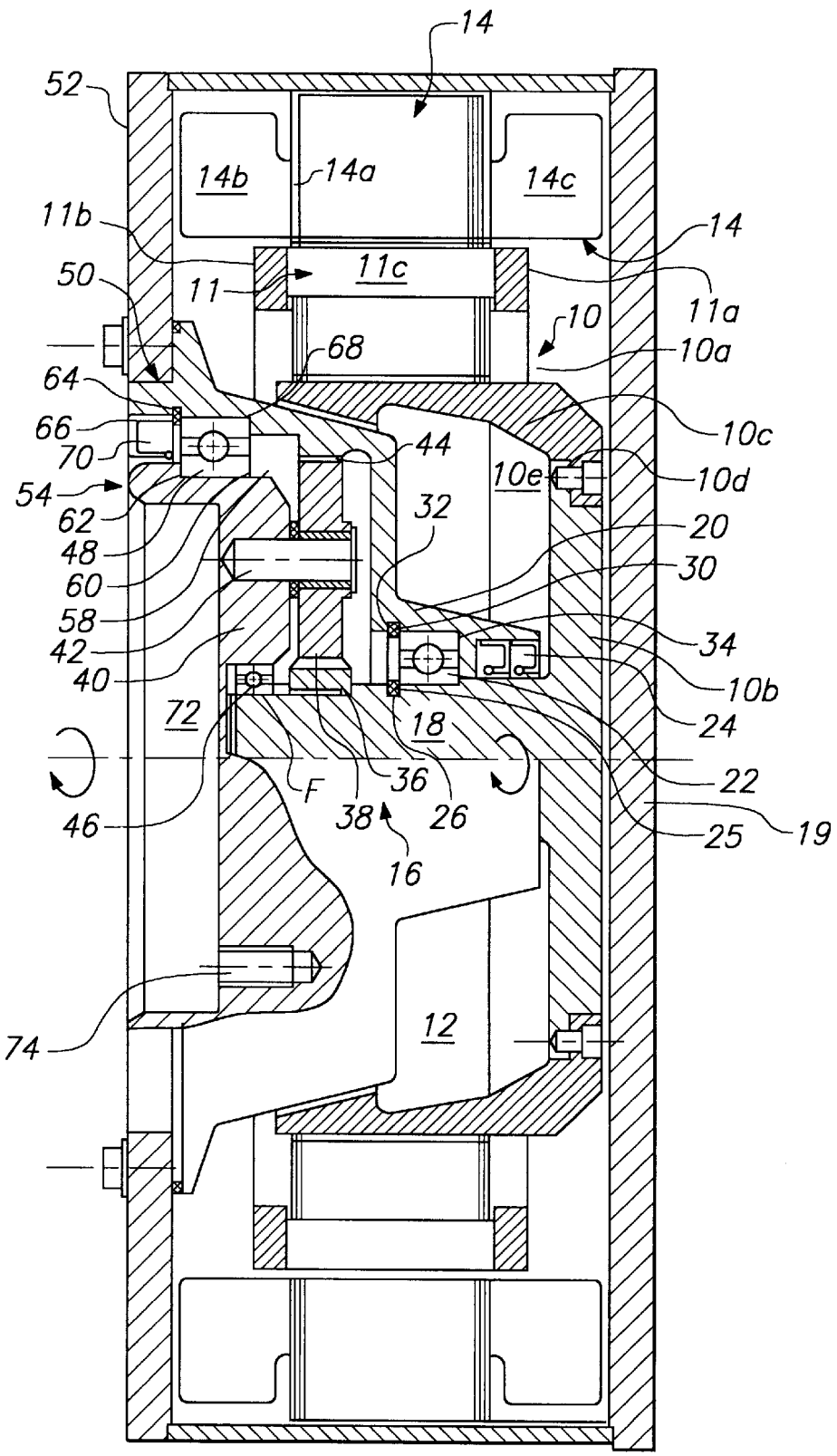

United States Patent
Rasch et al.

[11] Patent Number: 5,770,904
[45] Date of Patent: Jun. 23, 1998

[54] ELECTRIC MOTOR

[75] Inventors: Reinhard Rasch, Hechendorf; Andreas Gründl, München; Bernhard Hoffmann, Starnberg, all of Germany

[73] Assignee: Grundl und Hoffman GmbH Gesellschaft fur elektrotechnische Entwicklungen, Starnberg, Germany

[21] Appl. No.: 699,507
[22] PCT Filed: Mar. 2, 1995
[86] PCT No.: PCT/EP95/00767
  § 371 Date: Aug. 19, 1996
  § 102(e) Date: Aug. 19, 1996
[87] PCT Pub. No.: WO95/24761
  PCT Pub. Date: Sep. 14, 1995

[30] Foreign Application Priority Data

Mar. 8, 1994 [DE] Germany .......................... 44 07 714.3

[51] Int. Cl.$^6$ .................................................. H02K 7/10
[52] U.S. Cl. .......................... 310/75 R; 310/156; 310/83; 310/261
[58] Field of Search .......................... 310/83, 156, 261, 310/75 R; 290/22, 31

[56] References Cited

U.S. PATENT DOCUMENTS

| | | |
|---|---|---|
| 2,514,460 | 7/1950 | Tucker .................................. 172/287 |
| 4,274,023 | 6/1981 | Lamprey .................................. 310/83 |
| 5,019,733 | 5/1991 | Kano et al. .............................. 310/61 |

FOREIGN PATENT DOCUMENTS

| | | |
|---|---|---|
| 10 80 063 | 11/1927 | Austria . |
| 04 63 895 A1 | 1/1992 | European Pat. Off. ....... H02K 7/116 |
| 1 381 593 | 11/1964 | France . |
| 21 45 126 | 3/1973 | Germany .......................... H02K 9/19 |
| 24 55 567 A1 | 5/1976 | Germany .......................... H02K 9/24 |
| 25 38 561 A1 | 3/1977 | Germany .......................... H02K 9/19 |
| 34 44 420 A1 | 12/1984 | Germany .......................... H02K 7/10 |
| 85 13 219 | 5/1985 | Germany ........................ H02K 29/08 |
| 42 13 132 A1 | 11/1992 | Germany .......................... H02K 9/19 |
| 43 19 576 A1 | 6/1993 | Germany ........................ H02K 7/116 |
| 58-116044 | 7/1983 | Japan .............................. H02K 9/19 |
| 60-162434 | 8/1985 | Japan .............................. H02K 9/19 |
| 5-149401 | 6/1993 | Japan .............................. H02K 7/10 |
| 5-300692 | 11/1993 | Japan .............................. H02K 7/10 |
| 2250142 | 3/1992 | United Kingdom . |
| 2 250 063 | 5/1992 | United Kingdom ............. H02K 9/19 |

Primary Examiner—Thomas M. Dougherty
Assistant Examiner—Timothy A. Williams
Attorney, Agent, or Firm—Haverstock & Owens LLP

[57] ABSTRACT

An electric motor with an internal rotor (10), which comprises a free internal chamber (12), and a stator (14) disposed at a radial spacing from the rotor (10) has a more compact construction and can be assembled more easily. The electric motor is characterized in that at least part of a gear (16) is disposed in the free internal chamber (12) of the rotor (10).

7 Claims, 2 Drawing Sheets

ELECTRIC MOTOR

The present invention relates to an electric motor with an integrated gear unit.

From DE-U-85 13 219 an electric motor designed as an external armature is known, in the core area of which a planetary gear unit with a sun gear shaft, a planet carrier and a hollow planetary gear are accommodated, with the hollow planetary gear encompassing the planetary gear unit. The external armature is fastened at the sun gear shaft which is supported in the stator by means of two ball bearings. The stator again is connected with the hollow gear of the planetary gear unit via connecting screws with the gear unit being fastened to a structural housing part.

From EP-A-O 463 895 an electric motor with an internal armature and an internal planetary gear unit is known, the sun gear shaft of which is supported in the stationary housing of the electric motor by means of a ball bearing.

The present invention is based on the object to provide an electric motor with the bearing method for its movable parts and its assembly being simplified. At the same time, the shortest possible installation length of the electric motor is to be achieved.

This is solved according to the invention by means of an electric motor with the characteristics indicated in claim 1 or claim 2. According to the invention the armature is supported in the hollow planetary gear by means of an armature bell-side bearing via the sun gear shaft, and the inner end of the sun gear shaft rotatably bears against the planet carrier by means of another bearing, with the planet carrier being rotatably supported in the hollow planetary gear by means of a bearing. This bearing method achieves a compact design and, in particular, a short installation length as well as a simple assembly of the electric motor according to the invention.

The gear unit which is implemented as a planetary gear with its sun gear shaft and its planet carrier has a hollow planetary gear which forms the housing of the gear unit so that the gear unit is completely encapsulated against the surrounding parts of the electric motor. Moreover, the bearing of the sun gear shaft in the interior of the gear unit can be arranged in alignment with the bearing of the planet carrier.

According to the invention, the hollow planetary gear is provided with a fastening means for a supporting plate holding the stator which is advantageous in that no separate supporting of the gear unit is required. Rather, the suspension of the motor and the gear unit is effected by one and the same component. The gear moment is thus immediately introduced into the motor suspension.

The supporting plate for the stator encompasses the hollow planetary gear in the area of one of its faces (the output side) annularly. The armature cage and the stator windings are arranged in the axial extension of the annular supporting plate.

According to the invention, the hollow planetary gear may also be integrally connected with a supporting plate for the stator. This makes any additional (fastening) components and installation steps unnecessary. Moreover, this integral configuration of the supporting plate with the hollow planetary gear acts as an enlarged cooling surface for the gear unit which is preferably encapsulated and immersed in gear oil.

In another embodiment the supporting plate for the stator is arranged and fastened in a recess of the hollow planetary gear which opens towards the edge side in the area of one of its faces.

In a preferred embodiment the sun gear shaft comprises a fastening means for the armature at its end portion which protrudes from the hollow planetary gear.

In this case, too, separate bearings of the armature and the sun gear shaft can be eliminated.

Due to the fact that the armature is supported via the sun gear shaft in the hollow planetary gear in at least one bearing (the support is preferably effected by several bearings), an additional support of the sun gear shaft together with the armature at the housing of the electric motor is not necessary. This also eliminates additional seals which would be required in the housing of a coolant-cooled electric motor.

In a particularly preferred embodiment the sun gear shaft is integrally connected with the armature via its end portion which protrudes from the hollow planetary gear. This construction makes it possible to dispense with any connecting elements between the hollow planetary gear and the armature.

In all embodiments the planet carrier comprises an inwardly offset flange location. This embodiment permits a particularly short design and, with the electric motor being employed as a traction drive, is advantageous in that with a given track width the articulated shaft to be flange-connected can be made relatively long so that the necessary length compensation of the articulated shaft and the necessary angular flexibility are reduced.

Figure 2:
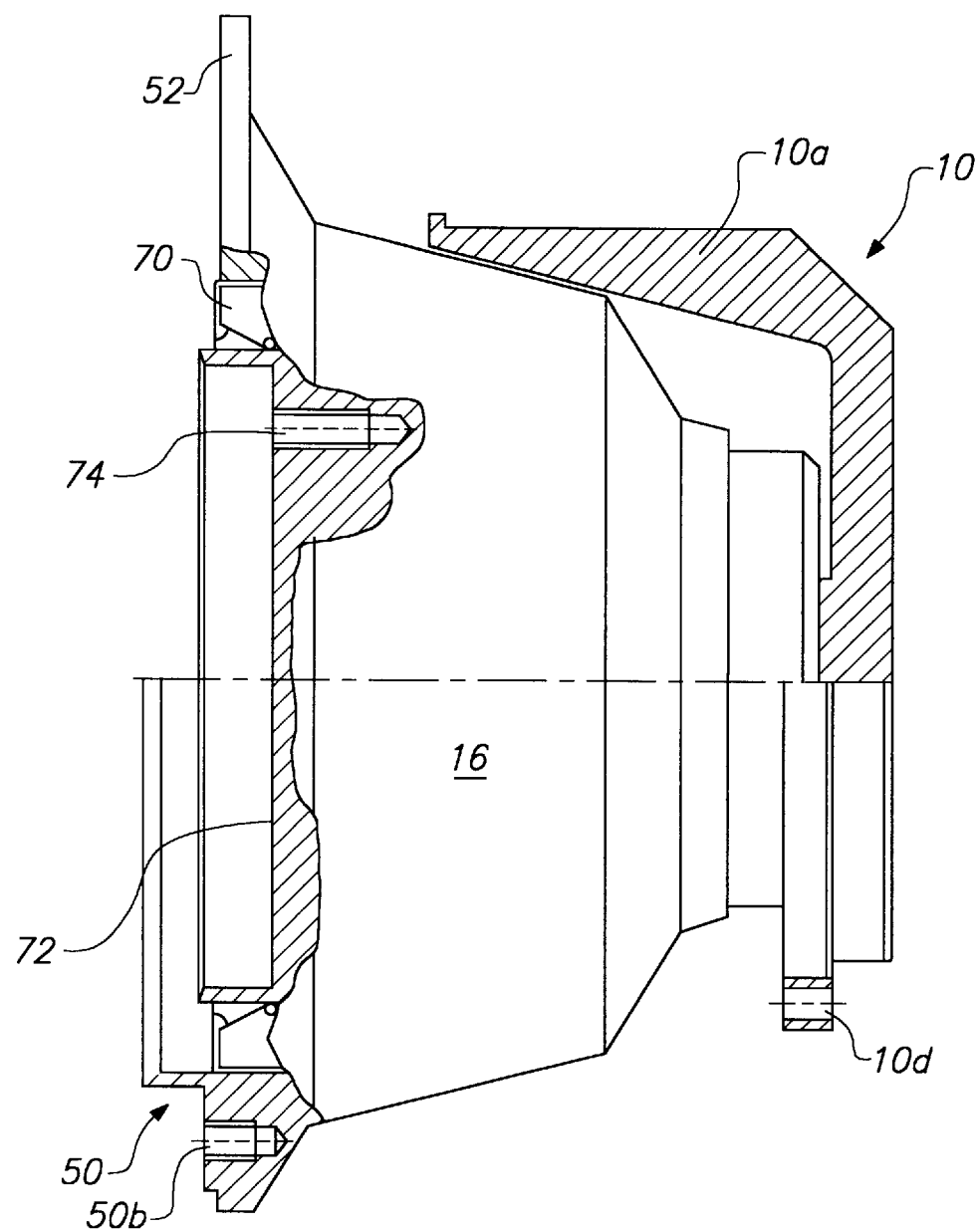

Further advantages and embodiments of the electric motor according to the invention will be explained in the following description with reference to the drawing in which:

FIG. 1 shows a schematic representation of the electric motor with the gear unit in a partial longitudinal section; and FIG. 2 shows two embodiments of a gear unit of the electric motor according to FIG. 1 with an armature bell arranged thereon.

FIG. 1 shows a brushless electric motor which is designed as an internal armature and which comprises a bell-shaped armature 10 with a free inner space 12. The armature is formed by an armature bell 10*a* which at its outer skirt 10*c* is provided with an armature laminated core 11 which is retained by a cage consisting of two axially spaced short-circuit rings 11*a*, 11*b* and copper bars 11*c* connecting same. In a radial distance to the armature 10 a stator iron core 14 is arranged so that an annular gap is formed. The stator iron core consists of a laminated core 14*a* as well as of stator windings, the winding heads 14*b*, 14*c* of which are protruding from both faces of the laminated core 14*a*.

The illustrated armature bell 10*a* is designed as a two-piece component, i.e. it consists of a face plate 10*b* and a skirt 10*c* which is screwed to the face plate 10*b* by means of a screw 10*e* inserted into a threaded hole 10*d* so as to be secured against rotation. The armature bell can, however, also be manufactured as a single-piece component.

A portion of a (reduction) gear unit 16, which is designed as a planet gear unit, is arranged in the free inner space 12 of the armature 10.

The gear unit 16 comprises a sun gear shaft 18 which is axially connected and secured against rotation with the armature bell 10*a*. This connection can be effected either by a shaft journal with a tooth profile onto which the armature bell is shrunk via a correspondingly shaped opening, or the armature bell is screw tightened on the shaft journal. The connection can also be made as a single-piece component, i.e. the sun gear shaft and the armature bell are commonly machined as one turned part.

It is understood that other connection techniques are also possible. The sole decisive factor is that the armature bell 10a is connected with the sun gear shaft 18 as short as possible and without any additional components.

The planet gear unit also comprises a hollow gear 20 which also forms the housing of the gear unit 16. The sun gear shaft 18 is supported by a ball bearing 22 in the hollow gear 20. Moreover, the side of the shaft feed-through which faces towards the armature bell 10a is provided with a seal 24.

The inner ring of the ball bearing 22 is fixed at the sun gear shaft 18 by means of a clamping ring 26 inserted into a groove 25 against a step 28. The outer ring of the ball bearing 22 is fixed at the hollow gear 20 by means of a clamping ring 32 inserted into a groove 30 against the front inner wall 34 of the hollow gear 20.

A sun gear 36 is seated secured against rotation on the sun gear shaft 18 and meshes with three planetary gears 38, only one of which being illustrated. The planetary gears 38 are retained by a planet carrier 40 with which each of them is connected by means of a journal 42. Moreover, the planetary gears mesh with an internal toothing 44 of the hollow gear 20.

The inner end of the sun gear shaft 18 rotatably bears against the planet carrier 40 by means of a bearing 46, said carrier bearing rotatably against the hollow gear 20 by means of a bearing 48. The two bearings 46 and 48 are oriented in a mutual alignment (see alignment line F).

The hollow planetary gear 20 has an outer contour which, in a sectionwise manner, follows the inner contour of the armature bell 10a. At the end which protrudes from the armature bell 10a the hollow planetary gear 20 comprises a fastening means 50 in the form of a flange for a supporting plate 52 for the stator 14. The supporting plate 52 for the stator 14 has an annular shape and encompasses the hollow planetary gear 20 in the area of its face 54 facing away from the armature bell 10a.

The fastening means 50 is formed by a recess 50a of the hollow planetary gear 20 which opens into its edge side in the area of its face 54 and by several threaded holes 50b which are equally spaced along the circumference so that the supporting plate 52 for the stator 14 is rigidly fastened at the hollow planetary gear 20. This embodiment is also illustrated in the lower half of FIG. 2.

In another embodiment (see FIG. 2, upper half) the hollow planetary gear 20 is integrally connected with the supporting plate 52 for the stator 14.

The inner ring of the ball bearing 48 is fixed at the planet carrier 40 by means of a clamping ring 60 inserted into a groove 58 against a step 62. The outer ring of the ball bearing 48 is fixed at the hollow gear 20 by means of a clamping ring 66 inserted into a groove 64 against a step 68 in the front inner wall 34 of the hollow gear 20.

At the outside of the clamping ring 66 a seal 70 is provided between the planet carrier 40 and the hollow planetary gear 20.

The planet carrier 40 comprises an inwardly offset flange location 72 in the form of a cylindrical recess which has several coaxial threaded holes 74 for a screw connection with an articulated shaft (not shown).

We claim:

1. An electric motor, comprising an internal rotor (10) and a stator (14) which is arranged at a radial distance therefrom, with the rotor (10) having a free inner space (12) in which at least a portion of a gear unit (16) which is designed as a planetary gear unit and which includes a sun gear shaft (18), a ring gear (20) and a planet wheel carrier (40) is arranged, the sun gear shaft (18) of which comprises a fastening means for the rotor (10) at an end portion which protrudes from the ring gear (20), and the ring gear (20) of which comprises a fastening means for a supporting plate (52) which encompasses the ring gear (20) in an area of one of its end faces (54) in an annular manner and which holds the stator (14), said [armature] rotor (10) being supported in the ring gear (20) by means of a rotor bell-side bearing (22) via the sun gear shaft (18), an inner end of the sun gear shaft (18) rotatably bearing against the planet wheel carrier (40) by means of a bearing (46), and said planet wheel carrier (40) being rotatably supported in the ring gear (20) by means of another bearing (48) and comprising an inwardly offset output flange location (72).

2. An electric motor, comprising an internal rotor (10) and a stator (14) which is arranged at a radial distance therefrom, with the rotor (10) having a free inner space (12) in which at least a portion of a gear unit (16) which is designed as a planetary gear unit and which includes a sun gear shaft (18), a ring gear (20) and a planet wheel carrier (40) is arranged, the ring gear (20) of which comprises a fastening means for a supporting plate (52) which encompasses the ring gear (20) in an area of one of its end faces (54) in an annular manner and which holds the stator (14), with the rotor (10) being supported via the sun gear shaft (18) which is integrally connected with the rotor (10) in the ring gear (20) by means of a rotor bell-side bearing (22), an inner end of the sun gear shaft (18) rotatably bearing against the planet wheel carrier (40) by means of a bearing (46) and said planet wheel carrier being rotatably supported in the ring gear (20) by means of another bearing (48) and comprising an inwardly offset flange location (72).

3. An electric motor having an integrated gear unit, the gear unit including a sun gear shaft, the electric motor comprising:

a. a ring gear, wherein an end of the sun gear shaft protrudes from the ring gear; and
   b. a rotor fastened to the protruded end of the sun gear shaft, wherein the rotor is supported by the ring gear via the sun gear shaft by means of bearings within the ring gear.

4. The electric motor according to claim 3 wherein an inner end of the sun gear shaft rotatably bears against a planet wheel carrier.

5. The electric motor according to claim 3 further comprising an annular supporting plate having an outer periphery and an inner periphery, wherein the ring gear is mounted to the inner periphery.

6. The electric motor according to claim 5 further comprising a stator coupled to the outer periphery of the annular supporting plate, wherein the stator is arranged at a radial distance from the rotor.

7. The electric motor according to claim 3 wherein the rotor is supported via the sun gear shaft by means of a rotor bell-side bearing.

* * * * *

UNITED STATES PATENT AND TRADEMARK OFFICE
CERTIFICATE OF CORRECTION

PATENT NO.   : 5,770,904

DATED        : June 23, 1998

INVENTOR(S) : Reinhard Rasch et al.

It is certified that error appears in the above-identified patent and that said Letters Patent is hereby correct as shown below:

TITLE PAGE

IN THE REFERENCES CITED:
France Patent Document 1 381 593 insert class --H02K--.
United Kingdom Patent Document 2250142 insert class/subclass --K02K/116--.

IN THE CLAIMS:
In Claim 1, Column 4, line 11, delete the word "[armature]" between the words "said" and "rotor."

Signed and Sealed this

Twenty-seventh Day of October, 1998

Attest:

BRUCE LEHMAN

*Attesting Officer*     Commissioner of Patents and Trademarks